UNITED STATES PATENT OFFICE.

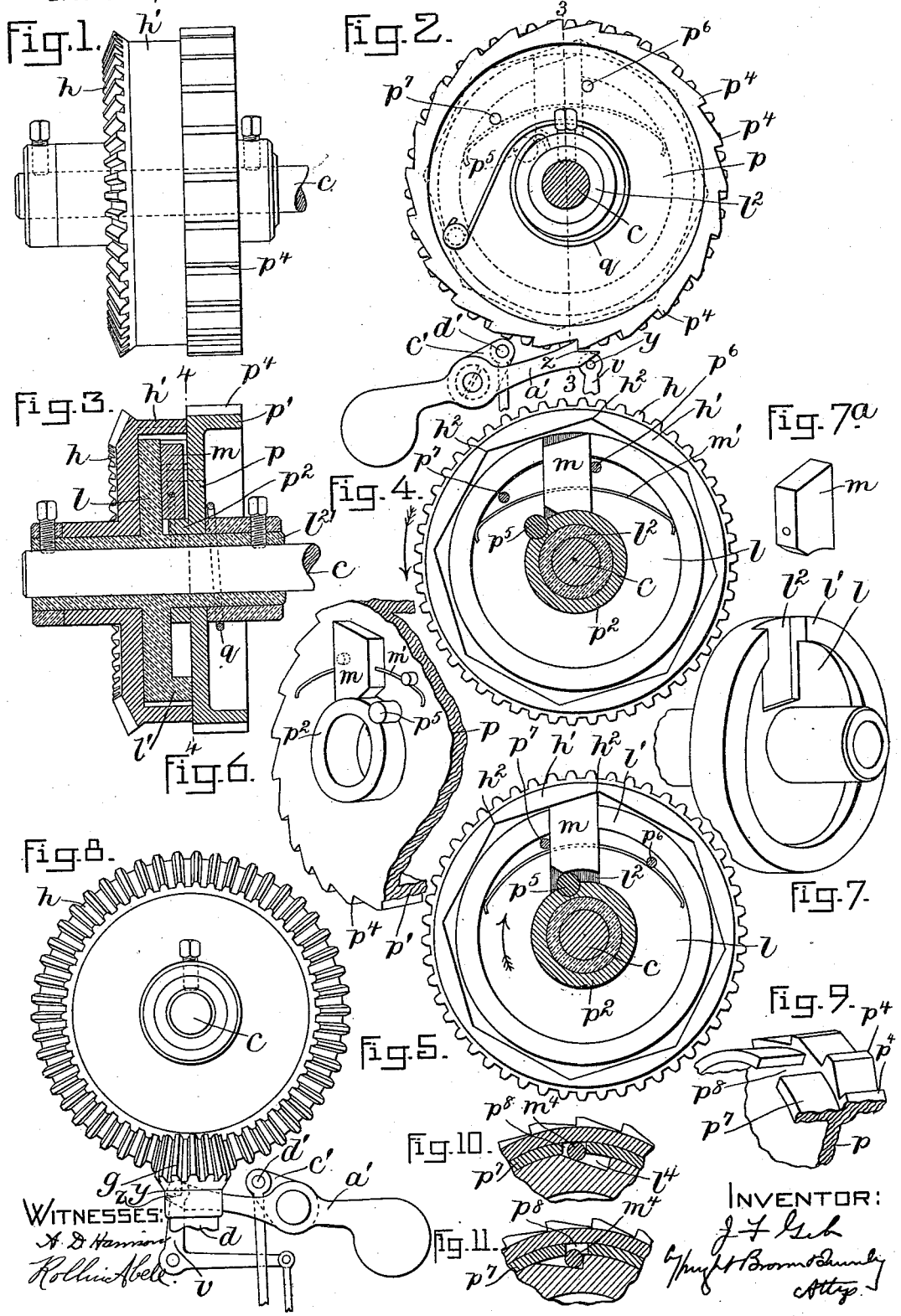

JACOB F. GEB, OF FRANKLIN, MASSACHUSETTS.

FEEDER FOR CARDING-ENGINES.

SPECIFICATION forming part of Letters Patent No. 550,913, dated December 3, 1895.

Application filed December 15, 1894. Serial No. 531,920. (No model.)

*To all whom it may concern:*

Be it known that I, JACOB FRANK GEB, of Franklin, in the county of Norfolk and State of Massachusetts, have invented certain new and useful Improvements in Feeders for Carding-Engines, of which the following is a specification.

This invention is intended chiefly as an improvement on the mechanism shown and described in Letters Patent of the United States, granted to me February 16, 1892, No. 469,206, for disconnecting the apron-shaft of the Bramwell feeder from its driving mechanism when the scale of the feeder is depressed to discharge its load of wool and connecting said shaft with the driving mechanism when the scale is raised to receive a fresh charge.

It is the object of the invention to provide more simple, durable, and effective mechanism for the purpose above mentioned; and to this end the invention consists in the improvements which I will now proceed to describe and claim.

Of the accompanying drawings, forming a part of this specification, Figure 1 represents a side elevation of my improved mechanism. Fig. 2 represents an end view of the same. Fig. 3 represents a section on line 3 3 of Fig. 2. Figs. 4 and 5 represent a section on line 4 4 of Fig. 3, showing the clutch members in different positions. Figs. 6, 7, and 7$^a$ represent perspective views of parts detached. Fig. 8 represents an elevation of the end opposite that shown in Fig. 2. Figs. 9, 10, and 11 represent views of a modification.

The same letters of reference indicate the same parts in all the figures.

In the drawings, $c$ represents the shaft which impels the toothed apron of the Bramwell feeder.

$h$ represents a bevel-gear, which is loose upon said shaft and is provided with an annular flange $h'$. Said gear $h$ is continuously rotated, as in my former patent, by power communicated from the driving-shaft (not shown) through a vertical shaft $d$, Fig. 8, geared at its lower end to the driving-shaft and having at its upper end a bevel-gear $g$, meshing with the gear $h$.

$l$ represents a collar which is affixed to or fast on the shaft $c$ and is provided with a flange $l'$ and with a slot or recess $l^2$, Fig. 7, which receives a loose dog or clutch $m$, adapted to slide in said slot toward and from the annular flange $h'$. Said collar connects or couples the clutch to the shaft, so that motion imparted to the clutch is imparted to the shaft through the collar $l$. Hence I call the latter a "coupling-collar." The inner surface of the flange $h'$ is polygonal, having numerous re-entrant angles, and when the clutch $m$ is moved outwardly it engages one of said angles, as shown in Fig. 5, thus locking the coupling-collar $l$ to the flange $h'$ and causing said flange, which is continuously rotated in the direction indicated by the arrow in Fig. 4, to rotate the shaft $c$; but when the clutch $m$ is moved inwardly, as shown in Fig. 4, it is released from the flange $h'$ and the rotation of the shaft $c$ ceases.

It will be observed that the clutch or clutch member $m$ is loose—that is, detached from the part that forces it into engagement with the flange of the gear—and is not withdrawn from engagement with said flange by means of said part at all, but is withdrawn either by reason of its own weight or by means of the spring, or both.

$p$ represents a clutch-controlling collar, which is loosely mounted on the hub $l^{2\prime}$ of the coupling-collar $l$ and is provided with a flange $p^2$ at its inner portion, against which the clutch $m$ is normally held by a spring $m'$, which is adapted to exert inward pressure on said clutch and thus hold it away from the flange $h'$. The controlling-collar $p$ is provided with a flange $p'$, on which are formed a series of ratchet-teeth $p^4$. Said collar is connected with the hub of the coupling-collar $l$ by means of a spring $q$, one end of which is attached to the controlling-collar $p$ and the other end to said hub or to a collar affixed thereto. Said spring yieldingly holds the controlling-collar $p$ and its flange $p^2$ in position to cause a boss or projection $p^5$ on said flange to move behind the clutch $m$ and thus press the latter outwardly into engagement with the flange $h'$, as shown in Fig. 5, and thus lock the shaft $c$ to the gear $h$. When the controlling-collar $p$ is arrested, as hereinafter described, the momentum of the shaft causes the clutch $m$ to leave the boss $p^5$, as shown in Fig. 4, and thus release the shaft from the gear. I employ means for automatically arresting the controlling-collar $p$ when the scale of the Bramwell feeder is depressed to discharge its load of wool and for automatically releasing said collar when the said scale returns to its receiving position. I prefer to employ means similar to those set forth in my former patent, to which reference may be had for a fuller description. Said means comprise, first, a weighted dog $a'$, which engages one of the ratchet-teeth $p^4$ by gravitation; secondly, an arm $c'$, which is provided with a stud $d'$, projecting over the dog $a'$, and is so connected with the scale of the feeder that after the latter has discharged its load the said arm will be depressed and remove the dog from the ratchet-tooth $p^4$, permitting the engagement of the shaft $c$ with the gear $h$, and, thirdly, a detent $y$ on a lever $v$, which is arranged to engage a notch $z$ in the dog $a'$ and hold the latter out of the path of the ratchet-teeth $p^4$, and is so connected with the scale of the feeder that when the latter is depressed by its load the detent will be disengaged from the dog, permitting the latter to engage a ratchet-tooth $p^4$, and thus arrest the controlling-collar $p$, and cause it to release the clutch $m$, the shaft $c$ being thus disconnected from the gear $h$, as already described.

It will be observed that the clutch $m$, adapted to connect the flange of the driven gear with the coupling-collar $l$ and shaft $c$, and the spring-pressed clutch-controlling collar $p$, provided with numerous ratchet-teeth, constitute a very simple, durable, and effective means for co-operating with the automatically-operated dog $a'$ in stopping and starting the apron-shaft $c$, the clutch being instantly and positively engaged with and disengaged from the flange $h'$, while the ratchet-teeth present so many points to engage the dog $a'$ that there is no possibility of the continuance of the rotation of the shaft after the depression of the scale.

The controlling-collar $p$ is provided with a projection $p^6$, which is in position to bear on the clutch $m$, as shown in Figs. 2 and 4, and arrest the clutch, clutch-coupling, and shaft after the controlling-collar has been arrested, thus preventing the clutch from moving too far from the boss $p^5$. A projection $p^7$ on the collar $p$ at the opposite side of the clutch from the projection $p^6$ comes in contact with the clutch when the latter is engaged with the flange $h'$, as shown in Fig. 5, and prevents the controlling-collar from being moved independently by the spring $q$ far enough in the direction indicated by the arrow in Fig. 5 to carry the boss $p^5$ away from the clutch. Said projections therefore act to keep the clutch and the boss in operative relation to each other.

I do not limit myself to the particular form of clutch, clutch-coupling collar, and clutch-controlling collar above described.

A modification is shown in Figs. 9, 10, and 11, in which the coupling-collar $l$ is provided with a recess $l^4$ in its periphery, having a longer side or face which forms the inner side of a tapering cavity containing a roll $m^4$, of hardened steel, constituting the clutch, the outer side of said cavity being the inner surface of the annular flange $h'$, which in this case is made cylindrical. When the roll is at the narrower end of the cavity, it is in contact with both sides thereof and is caused by the motion of the flange to lock the latter to coupling-collar $l$, and thus communicate motion to the shaft $c$; but when the roll is moved toward the wider end of the cavity it releases its hold and permits the rotation of the carrier and shaft to cease. The clutch-controlling collar $p$ has in this case a flange $p^7$ at its periphery, containing a slot $p^8$ in which the roll $m^4$ plays loosely.

The controlling-collar $p$ is provided with the teeth $p^4$ and operating-spring $q$, as in the previously-described construction. The spring normally holds the collar $p$ in position to engage the roll $m^4$ with the annular flange $h'$, as shown in Fig. 10, and when the controlling-collar $p$ is arrested by the dog $a'$ the roll is disengaged from said flange, as shown in Fig. 11.

I claim—

1. The combination of the apron-shaft, a driven gear loose thereon and provided with a flange, a loose clutch within said flange, and clutch-operating mechanism to positively operate the clutch in one direction only and hold it in engagement with the flange, said mechanism including a coupling-collar which is affixed to the shaft and connects the clutch therewith, a spring-pressed clutch-controlling collar which is loose on the shaft and is provided with external teeth adapted to be engaged by an arresting device, and means controlled by the weight of material being acted upon for arresting and releasing said controlling-collar.

2. The combination of the apron-shaft, a driven gear loose thereon and provided with an annular flange having a polygonal inner surface, a coupling-collar affixed to the shaft within said flange, a loose clutch or dog engaged with said coupling-collar and movable thereon toward and from the flange, said clutch being formed to engage the angles of the flange, a spring-pressed clutch-controlling collar loose on the shaft and formed to normally hold the clutch in engagement with the flange, and means for arresting and releasing said controlling-collar.

3. The combination of the apron-shaft, a driven gear loose thereon and provided with a flange, a loose clutch within said flange, clutch-operating mechanism whereby the clutch is normally held in engagement with the flange, said mechanism including a coupling-collar affixed to the shaft and connecting the clutch therewith, a spring-pressed clutch-controlling collar loose on the shaft and provided with external teeth and stops or projections on said controlling collar co-operating with the clutch in keeping the clutch and collar operatively related.

In testimony whereof I have signed my name to this specification, in the presence of two subscribing witnesses, this 12th day of December, A. D. 1894.

JACOB F. GEB.

Witnesses:
C. F. BROWN,
A. D. HARRISON.